(12) United States Patent
Myung et al.

(10) Patent No.: US 9,356,734 B2
(45) Date of Patent: May 31, 2016

(54) TRANSMITTER, RECEIVER, AND SIGNAL PROCESSING METHOD THEREOF

(71) Applicants: SAMSUNG ELECTRONICS CO., LTD., Suwon-si (KR); POSTECH ACADEMY-INDUSTRY FOUNDATION, Pohang-si (KR)

(72) Inventors: Se-ho Myung, Yongin-si (KR);
Kyung-joong Kim, Seoul (KR);
Hong-sil Jeong, Suwon-si (KR);
Kyeongcheol Yang, Pohang-si (KR);
Seung-chan Lim, Pohang-si (KR)

(73) Assignees: SAMSUNG ELECTRONICS CO., LTD., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 14/717,142

(22) Filed: May 20, 2015

(65) Prior Publication Data
US 2015/0341144 A1 Nov. 26, 2015

(30) Foreign Application Priority Data
May 21, 2014 (KR) .......................... 10-2014-0061075

(51) Int. Cl.
H04L 27/38 (2006.01)
H04L 1/00 (2006.01)
H04L 27/34 (2006.01)

(52) U.S. Cl.
CPC ............... *H04L 1/0071* (2013.01); *H04L 1/00* (2013.01); *H04L 1/0063* (2013.01); *H04L 27/34* (2013.01)

(58) Field of Classification Search
CPC ... H04L 1/0009; H04L 1/0043; H04L 1/0047; H03M 13/25; H03M 13/255; H03M 13/27; H03M 13/2778; H03M 13/2903; H03M 13/2789

USPC .......... 375/259–260, 265, 267, 285, 295–296; 714/752, 778

See application file for complete search history.

(56) References Cited

U.S. PATENT DOCUMENTS 5,659,579 A 8/1997 Herzberg
8,504,891 B2 8/2013 Zhou et al.
(Continued)

FOREIGN PATENT DOCUMENTS

KR 10-0383029 B1 8/2003
KR 10-2011-0033144 A 3/2011
KR 10-2011-0135349 A 12/2011

OTHER PUBLICATIONS

Hideki Imai, et al., "A New Multilevel Coding Method Using Error-Correcting Codes", IEEE Transactions on Information Theory, vol. IT-23, No. 3, May 1977, pp. 371-377.
(Continued)

*Primary Examiner* — Khanh C Tran
(74) *Attorney, Agent, or Firm* — Sughrue Mion, PLLC

(57) ABSTRACT

A transmitter, a receiver and signal processing methods are provided. The transmitter includes: an encoder configured to perform encoding on an information word based on a parity check matrix to generate a codeword including a plurality of non-binary symbols; an interleaver configured to interleave the codeword; and as modulator configured to modulate the interleaved codeword to generate a plurality of modulation symbols. The interleaver is configured to interleave the codeword such that the modulator maps a predetermined non-binary symbol from among the plurality of non-binary symbols constituting the codeword to a predetermined position in a modulation symbol among the plurality of modulation symbols.

18 Claims, 17 Drawing Sheets

(56) References Cited

U.S. PATENT DOCUMENTS

| | | | |
|---|---|---|---|
| 8,732,563 B2 | 5/2014 | Picchi et al. | |
| 8,793,551 B2* | 7/2014 | Zhou | H03M 13/253 |
| | | | 714/752 |
| 2011/0078533 A1* | 3/2011 | Zhou | H03M 13/253 |
| | | | 714/752 |
| 2011/0307754 A1* | 12/2011 | Sun | H03M 13/033 |
| | | | 714/752 |
| 2012/0134446 A1* | 5/2012 | Zhou | H03M 13/655 |
| | | | 375/320 |
| 2012/0260142 A1* | 10/2012 | Arabaci | H04L 1/0047 |
| | | | 714/752 |
| 2012/0260412 A1 | 10/2012 | Vargas et al. | |
| 2013/0139024 A1* | 5/2013 | Nguyen | H03M 13/033 |
| | | | 714/752 |
| 2013/0246884 A1* | 9/2013 | Lee | H04L 1/0009 |
| | | | 714/755 |
| 2014/0129895 A1* | 5/2014 | Petrov | H03M 13/1142 |
| | | | 714/752 |
| 2014/0229802 A1* | 8/2014 | Eroz | H03M 13/1165 |
| | | | 714/776 |
| 2014/0270759 A1* | 9/2014 | Djordjevic | H04L 1/0043 |
| | | | 398/44 |
| 2015/0188734 A1* | 7/2015 | Petrov | H03M 13/116 |
| | | | 375/260 |

OTHER PUBLICATIONS

Yan Li, et al., "Bit-Reliability Mapping in LDPC-Coded Modulation Systems", IEEE Communications Letters, vol. 9, No. 1, Jan. 2005, pp. 1-3.

Samsung Electronics 2006 Finalized Research Report, "Research regarding LDPC code suitable for adoptive modulation and encoding method, and multiplex antenna technology", total 253 pages.

Xiao-Yu Hu, et al., "Regular and Irregular Progressive Edge-Growth Tanner Graphs", IEEE Transactions on Information Theory, vol. 51, No. 1, Jan. 2005, pp. 386-398.

Charly Poulliat, et al., "Design of Regular (2, dc)-LDPC Codes over GF(q) Using Their Binary Images", IEEE Transactions on Communications, vol. 56, No. 10, Oct. 2008, pp. 1626-1635.

* cited by examiner

200

US 9,356,734 B2

TRANSMITTER, RECEIVER, AND SIGNAL PROCESSING METHOD THEREOF

CROSS-REFERENCE TO RELATED APPLICATION

This application claims priority from Korean Patent Application No. 10-2014-0061075, filed on May 21, 2014, in the Korean Intellectual Property Office, the disclosure of which is incorporated herein in its entirety by reference.

BACKGROUND

1. Field

Apparatuses and methods consistent with exemplary embodiments relate to signal transmission and processing, and more specifically, to non-binary encoding and signal processing.

2. Description of the Related Art

In a next generation communication system which requires a high capacity data transmission, a quadrature-amplitude modulation (QAM) is used as a modulation method which allows high frequency efficiency.

Compared with a binary low density parity check (LDPC) code, the higher is a modulation order of a QAM modulation method which is used in a communication system for a non-binary LDPC code defined over a Galois Field (GF), the more performance gain does the non-binary LDPC have and the more robust is the non-binary LDPC against an error floor. However, while a modulation order of a QAM modulation method increases, if the size of the GF, q, also increases, complexity of a non-binary LDPC code may increase drastically. Therefore, the size of the GF of a non-binary LDPC code, q, and a modulation order of a QAM modulation method should be adequately selected in consideration of the complexity of encoding.

Different variable nodes have different error correction capabilities depending on a modulation order in the iterative decoding process of a non-binary LDPC code. Accordingly, considering that decoding performances may differ depending on a method of combining codeword symbols into a single transmission symbol, better ways to mapping codeword symbols to a transmission symbol need to be sought for the purpose of achieving improved decoding performances.

SUMMARY

Considering the above-described necessities, various exemplary embodiments provide a transmitter for mapping a predetermined non-binary symbol from among non-binary symbols constituting a codeword to a predetermined position in a modulation symbol and a signaling processing method thereof.

According to an aspect of an exemplary embodiment, there is provided a transmitter of an information word. The transmitter may include: an encoder configured to perform encoding on an information word based on a parity check matrix to generate a codeword including a plurality of non-binary symbols; an interleaver configured to interleave the codeword; and a modulator configured to modulate the interleaved codeword to generate a plurality of modulation symbols. The interleaver may interleave the codeword such that the modulator maps a predetermined non-binary symbol from among the plurality of non-binary symbols constituting the codeword to a predetermined position in a modulation symbol among the plurality of modulation symbols.

The interleaver may interleave the codeword such that the modulator maps a non-binary symbol, which corresponds to a column having a relatively higher order in the parity check matrix among the plurality of non-binary symbols, to a most significant symbol (MSS) constituting the modulation symbol, and maps a non-binary symbol, which corresponds to a column having a relatively lower order in the parity check matrix among the plurality of non-binary symbols, to a least significant symbol (LSS) constituting the modulation symbol.

The interleaver may interleave the codeword such that the modulator maps a non-binary symbol, which corresponds to a column having a relatively lower order in the parity check matrix among the plurality of non-binary symbols, to an MSS constituting the modulation symbol, and maps a non-binary symbol, which corresponds to a column having a relatively higher order in the parity check matrix among the plurality of non-binary symbols, to an LSS constituting the modulation symbol.

According to an aspect of another exemplary embodiment, there is provided a signal processing method of a transmitter which may include: performing encoding on an information word based on a parity check matrix to generate a codeword including a plurality of non-binary symbols; interleaving the codeword; and modulating the interleaved codeword to generate a plurality of modulation symbols. The interleaving may include interleaving the codeword such that a predetermined non-binary symbol from among the plurality of non-binary symbols constituting the codeword is mapped to a predetermined position in a modulation symbol among the plurality of modulation symbols.

Here, the interleaving may include interleaving the codeword such that a non-binary symbol, which corresponds to a column having a relatively higher order in the parity check matrix among the plurality of non-binary symbols, is mapped to an MSS constituting the modulation symbol, and a non-binary symbol, which corresponds to a column having a relatively lower order in the parity check matrix among the plurality of non-binary symbols, is mapped to an LSS constituting the modulation symbol.

The interleaving may include interleaving the codeword such that a non-binary symbol, which corresponds to a column having a relatively higher order in the parity check matrix among the plurality of non-binary symbols, is mapped to an MSS constituting the modulation symbol, and a non-binary symbol, which corresponds to a column having a relatively lower order in the parity check matrix among the plurality of non-binary symbols, is mapped to an LSS constituting the modulation symbol.

According to various exemplary embodiments shown above, since a non-binary symbol is mapped to a modulation symbol in consideration of error correction capability of a non-binary LDPC code and reliability of a modulation symbol, performance degradation in transmission and reception of a signal including an information word can be reduced.

DETAILED DESCRIPTION OF THE EXEMPLARY EMBODIMENTS

Figure 1:
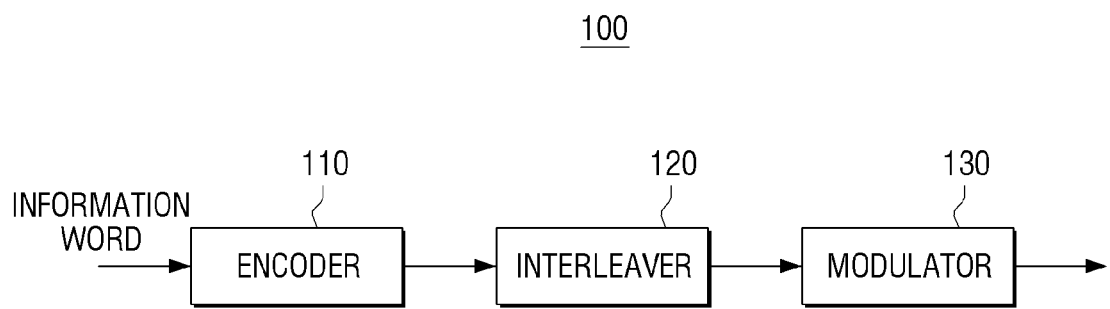
FIG. 1 is a block diagram provided to explain a configuration of a transmitter according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. It is apparent that the exemplary embodiments can be carried out without those specifically defined matters. Also, functions or elements known in the related art are not described in detail since they would obscure the exemplary embodiments with unnecessary detail.

FIG. 1 is a block diagram provided to explain a configuration of a transmitter according to an exemplary embodiment. According to FIG. 1, a transmitter 100 includes an encoder 110, an interleaver 120 and a modulator 130.

The encoder 110 performs non-binary encoding of an information word based on a parity check matrix to generate a codeword.

A parity check code is generally defined by a parity check matrix. In case of a non-binary code, i.e., a non-binary parity check code (or non-binary LDPC code), unlike a binary parity check code, entries constituting a parity check matrix are defined not only as 0 and 1 but also a non-binary symbol. Here, the non-binary symbol may not only be formed of entries of a Galois Field (GF) but also be expressed as entries of a ring or a group.

Hereinafter, only a non-binary parity check code defined on a GF will be explained for the sake of convenience in explanation. However, the inventive concept is not limited to the GF and may apply to a non-binary parity check code defined on a ring or a group.

For the sake of a detailed explanation on a non-binary parity check code, a parity check matrix H formed of entries $(0, 1, \alpha, \alpha2)$ on a GF (4) according to an exemplary embodiment is shown in following Equation 1.

$$H = \begin{bmatrix} 1 & 1 & 1 & 0 & 1 & 0 & 0 \\ \alpha & \alpha^2 & 0 & 1 & 0 & 1 & 0 \\ \alpha^2 & 0 & \alpha & \alpha & 0 & 0 & 1 \end{bmatrix} \quad \text{[Equation 1]}$$

When a codeword of a non-binary parity check code which is defined by Equation 1 is $c=(c_0, c_1, c_2, c_3, c_4, c_5, c_6)$ (herein, $c_n \in GF(4)$) for the sake of convenience, non-binary encoding may be deemed to generate a codeword satisfying Equation 2.

$$H \cdot \underline{c} = \begin{bmatrix} c_0 + c_1 + c_2 + c_4 \\ \alpha c_0 + \alpha^2 c_1 + c_3 + c_5 \\ \alpha^2 c_0 + \alpha c_2 + \alpha c_3 + c_6 \end{bmatrix} = \begin{bmatrix} 0 \\ 0 \\ 0 \end{bmatrix} = \underline{0} \quad \text{[Equation 2]}$$

Here, arithmetic operations such as adding and multiplying operations are defined over a GF(4).

Referring to Equation 2, each column of the parity check matrix H in Equation 1 corresponds to a single parity-check equation. Further, a value of each parity-check equation for the codeword c is always 0.

Generally, when a parity check matrix having an M×N size for a non-binary parity check code defined over GF(q) is H, and a codeword of a length of N is $\underline{c}=(c_0, c_1, \ldots, c_{N-1})$, following Equation 3 is defined.

$$\sum_{n \in N(m)} H_{nm} c_n = 0, m = 0, 1, 2, \ldots, (M-1) \quad \text{[Equation 3]}$$

Here, $H_{mn}$ denotes an entry which is located in the $m^{th}$ row and in the $n^{th}$ column of a parity check matrix H. $N(m)$ denotes a set $N(m)=\{n:Hmn \neq 0\}$, which indicates a position of a column which corresponds to an entry other than 0 in the $m^{th}$ row in the parity check matrix H. In Equation 3, $H_{mn}$, a codeword symbol $c_n$, is an entry of GF(q), and all of the adding operation and the multiplying operation are defined over GF(q).

Meanwhile, the codeword of a non-binary parity check code defined by Equation 3 is formed of non-binary symbols. However, when modulation applies to a non-binary parity check code, modulation may apply only after a non-binary symbol is converted into bit unit and then is mapped to a constellation. Here, the non-binary symbol defined over by GF(q) may be converted to $\lceil \log_2 q \rceil$ bit. For instance, in case of a non-binary parity check code defined by Equation 3, when a codeword has a length of N and a codeword symbol is defined over GF(q), the codeword of the non-binary code may be formed of $N \times \lceil \log_2 q \rceil$ number of bits.

The encoder 100 may perform non-binary LDPC coding according to the above-described method to generate a codeword. That is, the encoder 110 may first convert input bits to non-binary symbols and then generate a codeword formed of the non-binary symbols based on the above converted non-binary symbols.

As shown above, considering that non-binary LDPC encoding is performed on the basis of a symbol over GF(q), a codeword generated by non-binary LDPC encoding may be formed of a plurality of non-binary symbols.

For instance, the encoder 110 may perform non-binary LDPC encoding of z, which is q-ary information word vector of a length of K by using a code rate of R=K/N to generate $\underline{c}=(c_1, c_2, \ldots, c_N)$, which is q-ary codeword vector of a length of N.

Information on a parity check matrix used for non-binary LDPC encoding, i.e., information on values of elements constituting the parity check matrix and information on rows and columns where each element exists, may be pre-stored in the transmitter 100.

The interleaver 120 interleaves a codeword. Herein, interleaving refers to re-arranging orders of non-binary symbols constituting the codeword.

For instance, $\underline{c}=(c_1, c_2, \ldots, c_N)$, which is q-ary codeword vector of a length of N, may be converted to a codeword vector $\underline{c}_\Pi=(c_{\pi(1)}, c_{\pi(2)}, \ldots, c_{\pi(N)})$ by interleaving. Herein, $\pi: \{1, 2, \ldots, N\} \rightarrow \{1, 2, \ldots, N\}$ refers to permutation function.

As shown above, mapping may be defined as a process where orders of non-binary symbols constituting a codeword vector c is changed, and thus the codeword vector $\underline{c}$ is converted into a code vector $\underline{c}\Pi$.

The modulator 130 modulates an interleaved codeword to generate a plurality of modulation symbols. Specifically, the modulator 130 may map non-binary symbols constituting the interleaved codeword to constellation by using a $q^2$-QAM modulation method.

For instance, when $\underline{c}_\Pi=(c_{\pi(1)}, c_{\pi(2)}, \ldots, c_{\pi(N)})$, which is a codeword vector output from the interleaver 120, is formed of elements of GF(4), the modulator 130 may map $c_{\pi(1)}$, $c_{\pi(2)}, \ldots, c_{\pi(N)}$, which are non-binary symbols constituting the codeword vector, to constellation points by using a 16-QAM modulation method to generate modulation symbols.

Here, two codeword symbols constituting a modulation symbol may be considered to be transmitted through q-ary equivalent channels having different reliabilities. For instance, to transfer a $q^2$-QAM modulation symbol may be considered to transfer each of codeword symbols (e.g., non-binary symbols) constituting the $q^2$-QAM by using two q-ary input channels.

Hereinafter, each of q-ary equivalent channels which is used for transmitting a single $q^2$-QAM modulation symbol is referred to as a sub-channel. For instance, when a non-binary LDPC code which is defined over GF(4) is transmitted using a 16-QAM modulation method, a first sub-channel may be a channel assigned to a most significant symbol (MSS) of a modulation symbol, and a second sub-channel may be a channel assigned to a least significant symbol (LSS).

Accordingly, since when the modulator 130 performs modulation by a 16-QAM modulation method, a modulation symbol (i.e., 16-QAM modulation symbol) is formed of two symbols (i.e., MSS, LSS), two non-binary symbols from among $c_{\pi(1)}, c_{\pi(2)}, \ldots, c_{\pi(N)}$, which are non-binary symbols constituting a codeword vector, may be sequentially mapped to 16-QAM modulation symbols.

As shown above, two codeword symbols are mapped to a modulation symbol by a $q^2$-QAM modulation method, $\underline{c}$, which is q-ary codeword vector of a length of N, may be formed of $\underline{x}$, a transmission vector of a length of N/2, through non-binary LDPC encoding, and may be transmitted to a receiver (400 at FIG. 4) through a channel (e.g., additive white Gaussian noise (AWGN)).

According to the present exemplary embodiment, non-binary symbols generated by non-binary LDPC encoding may be mapped to modulation symbols, considering error correction capability of a non-binary LDPC code and reliability of a modulation symbol.

To achieve the above mapping, the interleaver 120 may interleave a codeword, such that a predetermined non-binary symbol from among non-binary symbols constituting a codeword is mapped to a predetermined position in a modulation symbol.

Specifically, the interleaver 120 may interleave a codeword, such that a non-binary symbol which corresponds to a column having a relatively higher order in a parity check matrix is mapped to an MSS constituting a modulation symbol and a non-binary symbol which corresponds to a column having a relatively lower order in the parity check matrix is mapped to an LSS constituting a modulation symbol.

That is, the interleaver 120 may rearrange orders of non-binary symbols constituting a codeword, such that a non-binary symbol which corresponds to a variable node having a relatively higher order in a parity check matrix is mapped to an MSS having a relatively higher reliability in a modulation symbol and a non-binary symbol which corresponds to a variable node having a relatively lower order in the parity check matrix is mapped to an LSS having a relatively lower reliability in the modulation symbol.

On the other hand, the interleaver 120 may interleaves a codeword, such that a non-binary symbol which corresponds to a column having a relatively lower order in a parity check matrix is mapped to an MSS constituting a modulation symbol and a non-binary symbol which corresponds to a column having a relatively higher order in the parity check matrix is mapped to an LSS constituting the modulation symbol.

That is, the interleaver 120 may rearrange orders of non-binary symbols constituting a codeword, such that a non-binary symbol which corresponds to a variable node having a relatively lower order in a parity check matrix is mapped to an MSS having a relatively higher reliability in a modulation symbol and a non-binary symbol which corresponds to a variable node having a relatively higher order in the parity check matrix is mapped to an LSS having a relatively lower reliability in the modulation symbol.

Figure 2:
FIGS. 2 and 3 are diagrams provided to explain an interleaving method according to exemplary embodiments.

For instance, it is assumed that a parity check matrix is as shown in FIG. 2 and modulation is performed using a 16-QAM modulation method. In $H_{ex}(200)$, a parity check matrix in FIG. 2, entries other than 1, $\alpha$, $\alpha_2$ have 0.

Referring to FIG. 2, the degrees of the six columns on the left of the parity check matrix, $H_{ex}(200)$, is 3 and the degrees of the six columns on the right of the parity check matrix is 2.

Accordingly, $c_1, c_2, \ldots, c_6$ from among non-binary symbols constituting a codeword vector, $\underline{c}=(c_1, c_2, \ldots, c_{12})$, may be deemed to correspond to variable nodes having a relatively higher degree, and $c_7, c_8, \ldots, c_{12}$ may be deemed to correspond to variable nodes having a relatively lower degree.

When the modulator 130 performs modulation by a 16-QAM modulation method, pairs of two non-binary symbols from among non-binary symbols output from the interleaver 120 may be sequentially mapped to constellation. Accordingly, non-binary symbols having odd numbered indexes from among non-binary symbols input into the modulator 130 may be mapped to MSSs of 16-QAM modulation symbols and non-binary symbols having even numbered indexes may be mapped to LSSs of 16-QAM modulation symbols.

Therefore, in order for the modulator 130 to map non-binary symbols, which correspond to variable nodes having a relatively higher order in a parity check matrix, to MSSs of 16-QAM modulation symbols and map non-binary symbols, which correspond to variable nodes having a relatively lower order in the parity check matrix, to LSSs of the 16-QAM modulation symbols, the interleaver 120 may perform interleaving such that a non-binary symbol which corresponds to a variable node having a relatively higher order and a non-binary symbol which corresponds to a variable node having a relatively lower order are arranged alternately with each other. That is, the interleaver 120 may interleave the codeword or codeword vector to generate a plurality of pairs of non-binary symbols, each pair having a non-binary symbol corresponding to a column having a relatively higher order followed by a non-binary symbol corresponding to a column having a relatively lower order.

For instance, the interleaver 120 may interleave a codeword vector, $\underline{c}=(c_1, c_2, \ldots, c_{12})$ to generate a codeword vector, such as $\underline{c}_\Pi=(c_{\pi(1)}, c_{\pi(2)}, \ldots, c_{\pi(12)})=(c_1, c_7, c_2, c_8, c_3, c_9, c_4, c_{10}, c_5, c_{11}, c_6, c_{12})$.

Accordingly, since non-binary symbols output from the interleaver 120 are mapped to 16-QAM modulation symbols in order of $[c_{\pi(1)}, c_{\pi(2)}]=[c_1, c_7]$, $[c_{\pi(3)}, c_{\pi(4)}]=[c_2, c_8]$, $[c_{\pi(5)}, c_{\pi(6)}]=[c_3, c_9]$, $[c_{\pi(7)}, c_{\pi(8)}]=[c_4, c_{10}]$, $[c_{\pi(9)}, c_{\pi(10)}]=[c_5, c_{11}]$, $[c_{\pi(11)}, c_{\pi(12)}]=[c_6, c_{12}]$, non-binary symbols which correspond to variable nodes having a relatively higher order, $c_1, c_2, \ldots, c_6$, constitute MSSs in the 16-QAM modulation symbols, and non-binary symbols which correspond to variable nodes having a relatively lower order, $c_7, c_8, \ldots, c_{12}$, constitute LSSs in the 16-QAM modulation symbols.

As shown above, a method according to which a non-binary symbol which corresponds to a variable node having a relatively higher order is transmitted through a sub-channel where an MSS having a higher reliability is assigned is referred to as symbol-reliability (SR) mapping.

By comparison, in order that non-binary symbols which correspond to variable nodes having a relatively lower order in a parity check matrix are mapped to MSSs of 16-QAM modulation symbols and non-binary symbols which correspond to variable nodes having a relatively higher order in the parity check matrix are mapped to LSSs of the 16-QAM modulation symbols, the interleaver 120 may perform interleaving such that a non-binary symbol which corresponds to a variable node having a relatively lower order and a non-binary symbol which corresponds to a variable node having a relatively higher order are arranged alternately with each other. That is, the interleaver 120 may interleave the codeword or codeword vector to generate a plurality of pairs of non-binary symbols, each pair having a non-binary symbol corresponding to a column having a relatively lower order followed by a non-binary symbol corresponding to a column having a relatively higher order.

For instance, the interleaver 120 may interleave a codeword vector, $\underline{c}=(c_1, c_2, \ldots, c_{12})$, to generate a codeword vector such as $\underline{c}_\Pi=(c_{\pi(1)}, c_{\pi(2)}, \ldots, c_{\pi(12)})=(c_7, c_1, c_8, c_2, c_9, c_3, c_{10}, c_4, c_{11}, c_5, c_{12}, c_6)$.

Accordingly, since non-binary symbols output from the interleaver 120 are mapped to 16-QAM modulation symbols in order of $[c_{\pi(1)}, c_{\pi(2)}]=[c_7, c_1]$, $[c_{\pi(3)}, c_{\pi(4)}]=[c_8, c_2]$, $[c_{\pi(5)}, c_{\pi(6)}]=[c_9, c_3]$, $[c_{\pi(7)}, c_{\pi(8)}]=[c_{10}, c_4]$, $[c_{\pi(9)}, c_{\pi(10)}]=[c_{11}, c_5]$, $[c_{\pi(11)}, c_{\pi(12)}]=[c_{12}, c_6]$, non-binary symbols which correspond to variable nodes having a relatively higher order, $c_7, c_8, \ldots, c_{12}$, constitute MSSs in the 16-QAM modulation symbols, and non-binary symbols which correspond to variable nodes having a relatively lower order, $c_1, c_2, \ldots, c_6$, constitute LSSs in the 16-QAM modulation symbols.

As shown above, a method according to which a non-binary symbol which corresponds to a variable node having a relatively higher order is transmitted through a sub-channel where an LSS having a lower reliability is assigned is referred to as symbol-reliability compensation (SRC) mapping.

In case of an LDPC code, variable nodes having a relatively higher order have a higher possibility that errors are corrected in an iterative decoding process, compared with variable nodes having a relatively lower order. Accordingly, when non-binary symbols corresponding to variable nodes having a relatively higher degree is transmitted to a sub-channel having a low reliability, a lost reliability can be compensated by an iterative decoding process, thereby reducing performance degradation.

Figure 3:
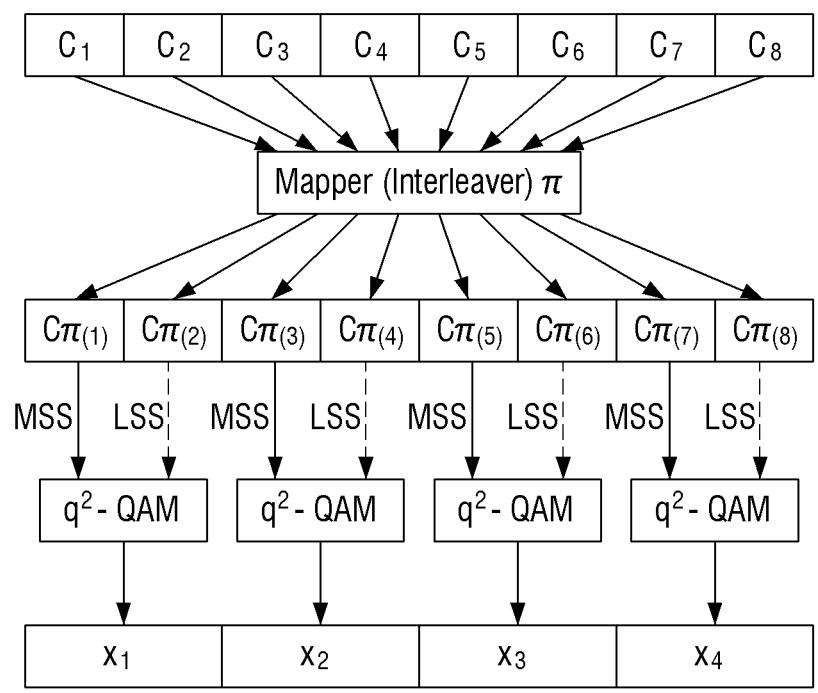

FIG. 3 is a diagram provided to explain a process in which a non-binary symbol is mapped to a modulation symbol according to an exemplary embodiment.

FIG. 3 illustrates a case where $\underline{c}=(c_1, c_2, \ldots, c_{12})$, a codeword vector which includes 12 non-binary symbols, is generated.

Referring to FIG. 3, the codeword vector, $\underline{c}$, is interleaved by the interleaver 120 and non-binary symbols constituting $\underline{c}_\Pi=(c_{\pi(1)}, c_{\pi(2)}, \ldots, c_{\pi(12)})$, which is a codeword vector generated by the interleaving, are sequentially mapped to $q^2$-QAM modulation symbols, thereby generating a transmission vector x.

In this case, the interleaver 120 may interleave the codeword vector, such that a non-binary symbol which corresponds to a column having a relatively higher order in a parity check matrix is mapped to an MSS constituting a modulation symbol and a non-binary symbol which corresponds to a column having a relatively lower order is mapped to an LSS constituting the modulation symbol.

Meanwhile, the interleaver 120 may interleave the codeword vector, such that a non-binary symbol which corresponds to a column having a relatively lower order in a parity check matrix is mapped to an MSS constituting a modulation symbol and a non-binary symbol which corresponds to a column having a relatively higher order is mapped to an LSS constituting the modulation symbol.

Figure 4:
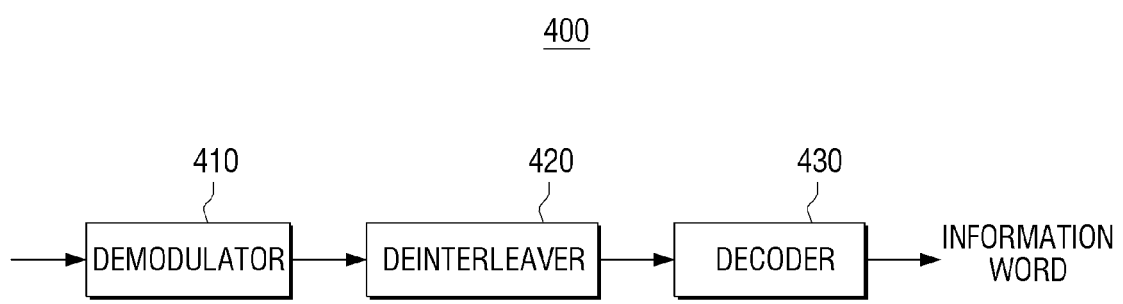
FIG. 4 is a block diagram provided to explain a configuration of a receiver according to an exemplary embodiment.

FIG. 4 is a block diagram provided to explain a configuration of a receiver according to an exemplary embodiment. Referring to FIG. 4, a receiver 400 includes a demodulator 410, a deinterleaver 420 and a decoder 430.

The demodulator 410 generates a channel value with respect to a signal received from a channel. Here, the channel value, which is a reliability vector in an initial stage with respect to each of codeword symbols calculated based on a received symbol vector, may be determined by various methods. For instance, a log-likelihood ratio (LLR) on a symbol basis may be the channel value.

The deinterleaver 420 performs deinterleaving with respect to an output value from the demodulator 410.

Specifically, the deinterleaver 420 is an element corresponding to an interleaver 120 of the transmitter 100 of FIG. 1, and may perform an operation corresponding to that of the interleaver 120 of the transmitter 100. That is, the deinterleaver 420 performs a reverse process of the interleaving operation performed the interleaver 120 and rearranges orders of LLR values on a symbol basis, which are output from the demodulator 410.

Information on interleaving rules used by the transmitter 100 may be pre-stored in the receiver 400 or be provided by the transmitter 100.

The decoder 430 performs decoding with respect to output values from the deinterleaver 420.

Specifically, the decoder 430 is an element corresponding to the encoder 110 of the transmitter 100 and may perform an operation corresponding to that performed by the encoder 110. That is, the decoder 430 performs non-binary LDPC decoding of the LLR values on a symbol basis, which are output from the deinterleaver 420, by using q-ary sum-product algorithm (QSPA) to recover an information word.

Hereinafter, performance of a non-binary parity check code that can be made when using SR mapping and SRC mapping respectively will be explained with reference to FIGS. 5 to 6.

Figure 5:
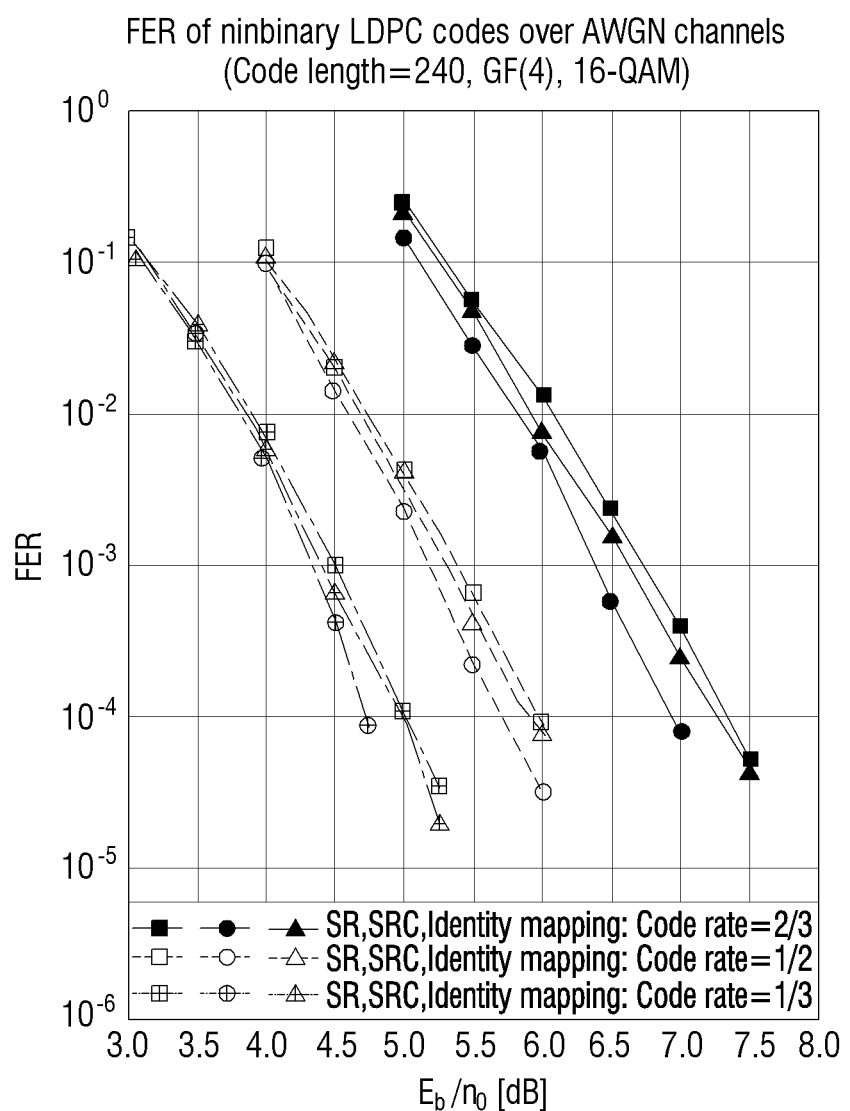
FIGS. 5 to 16 are diagrams provided to explain performances of a non-binary parity check codeword when SR mapping and SRC mapping are utilized, respectively, according to exemplary embodiments.
Figure 6:
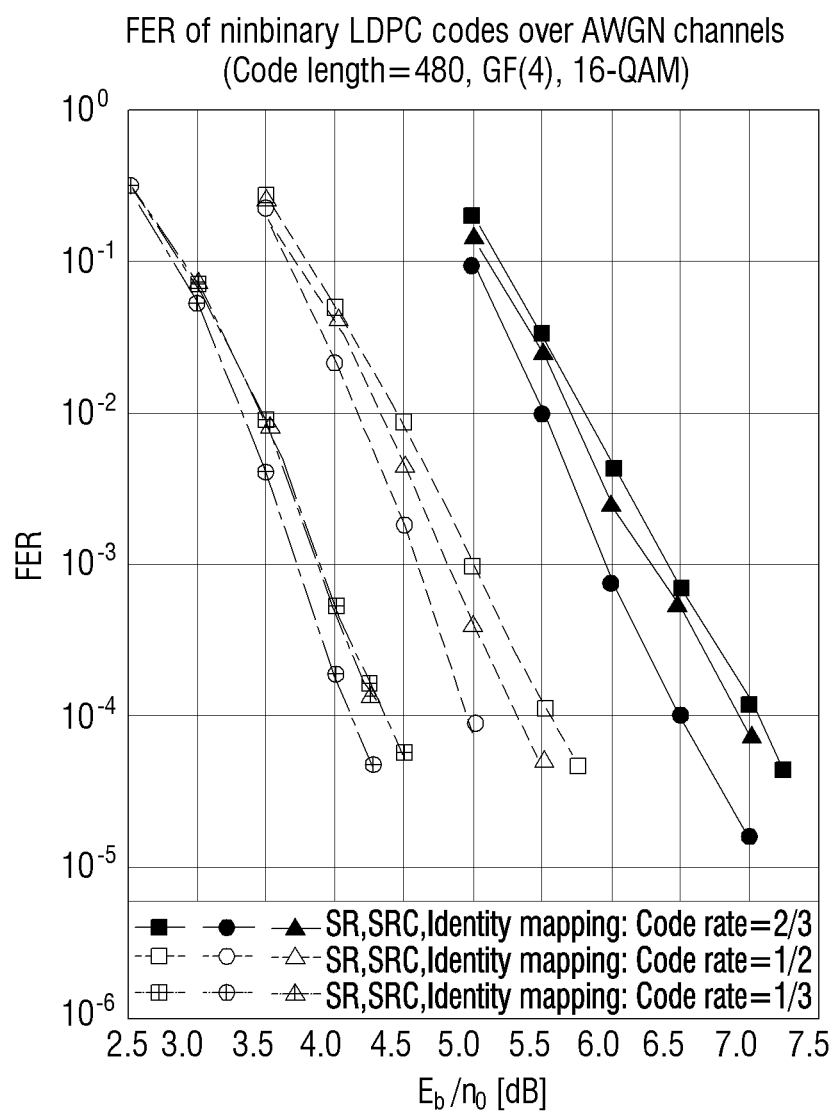
Figure 7:
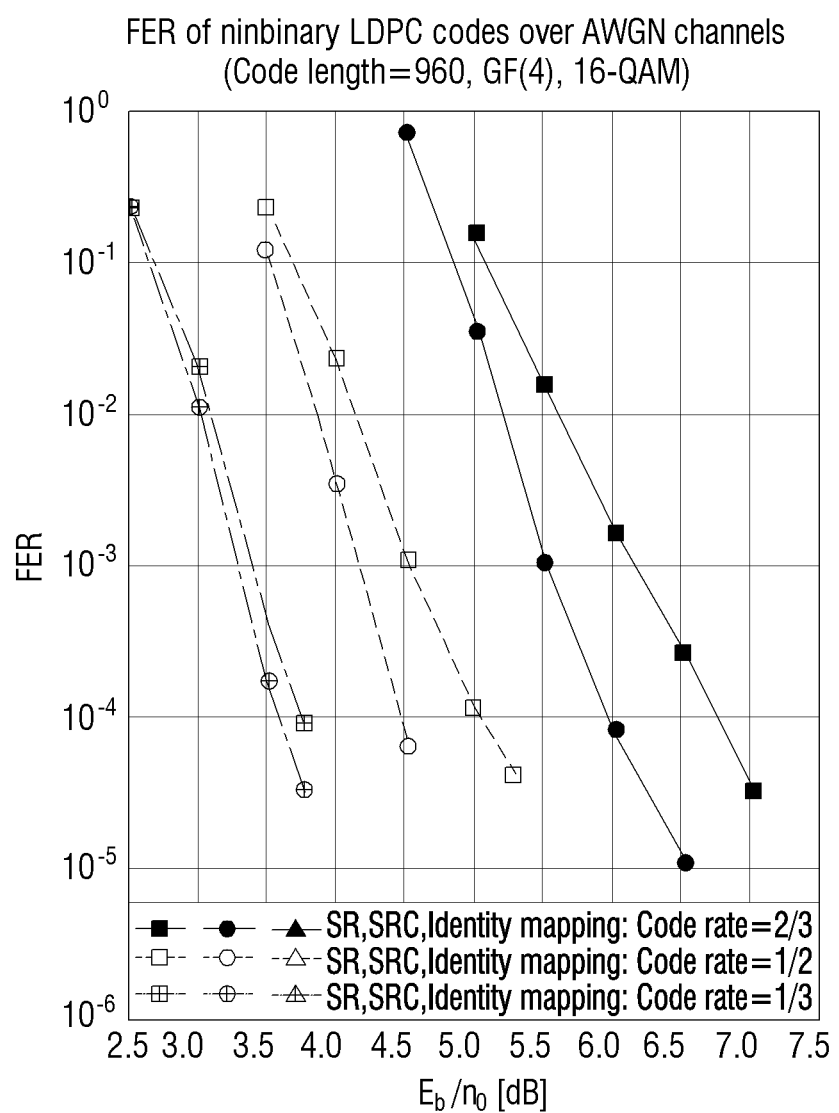
Figure 8:
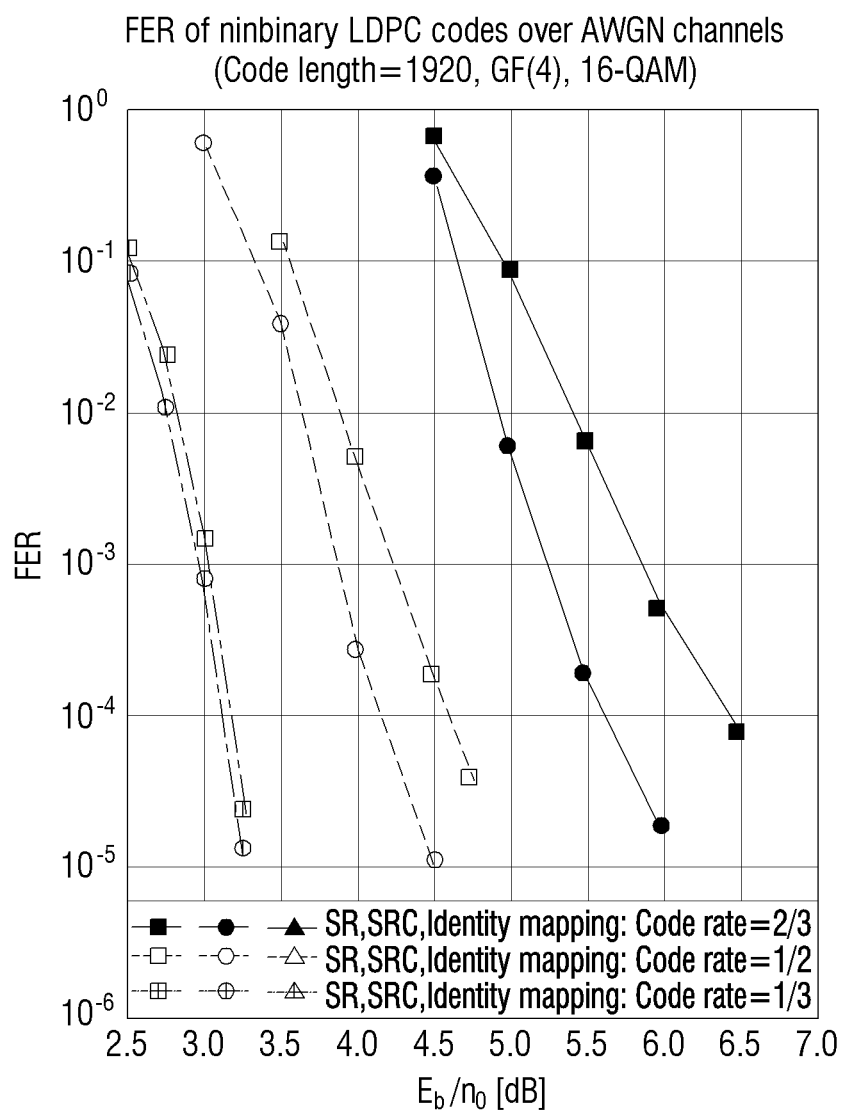
Figure 9:
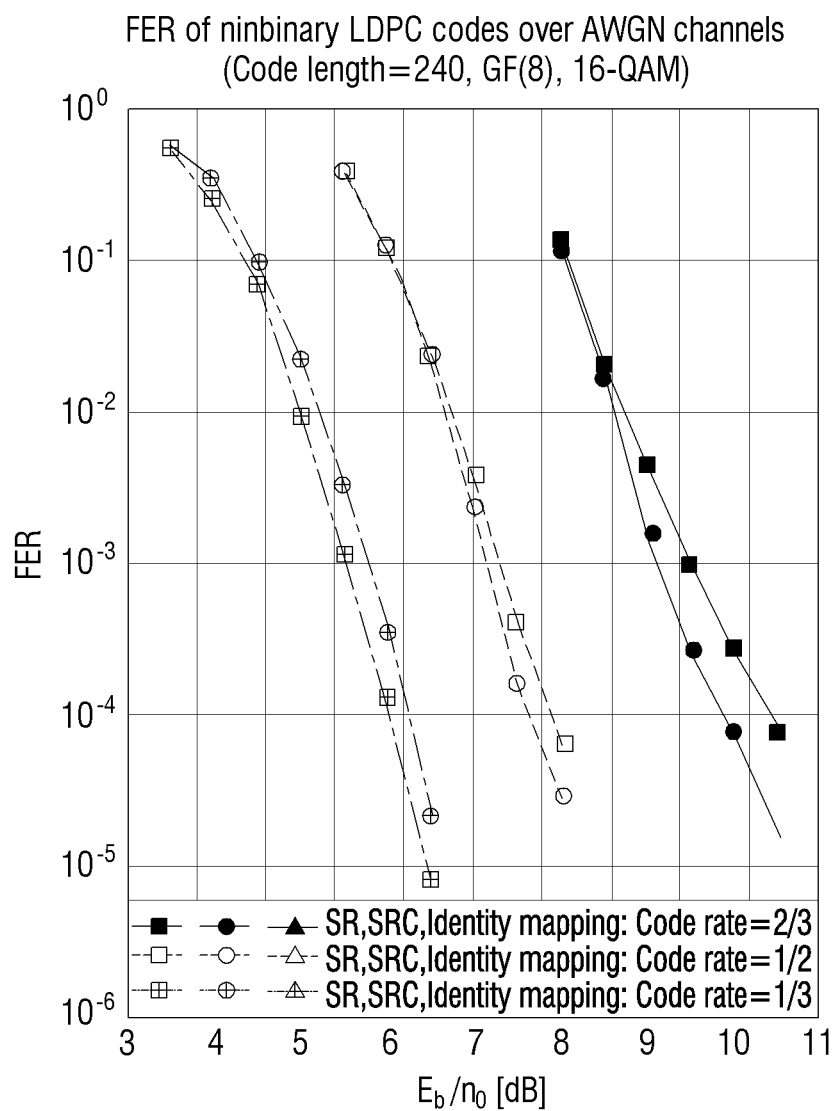
Figure 10:
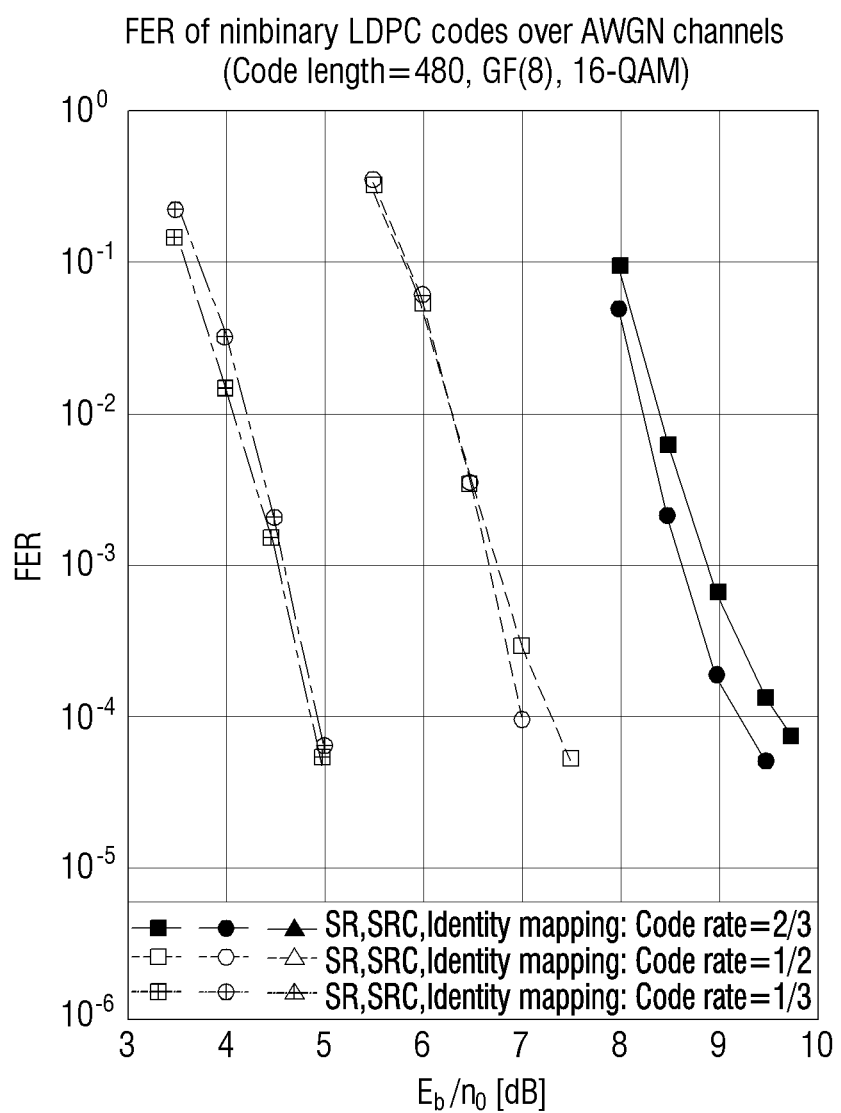
Figure 11:
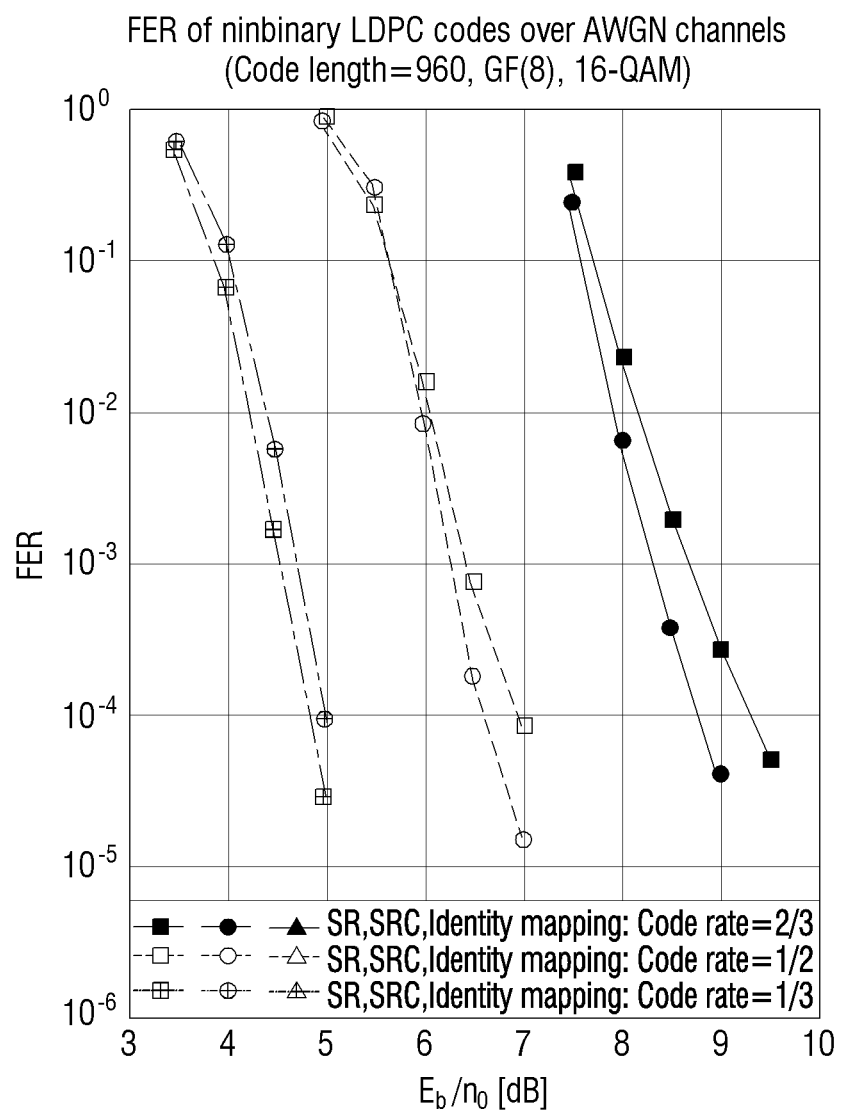
Figure 12:
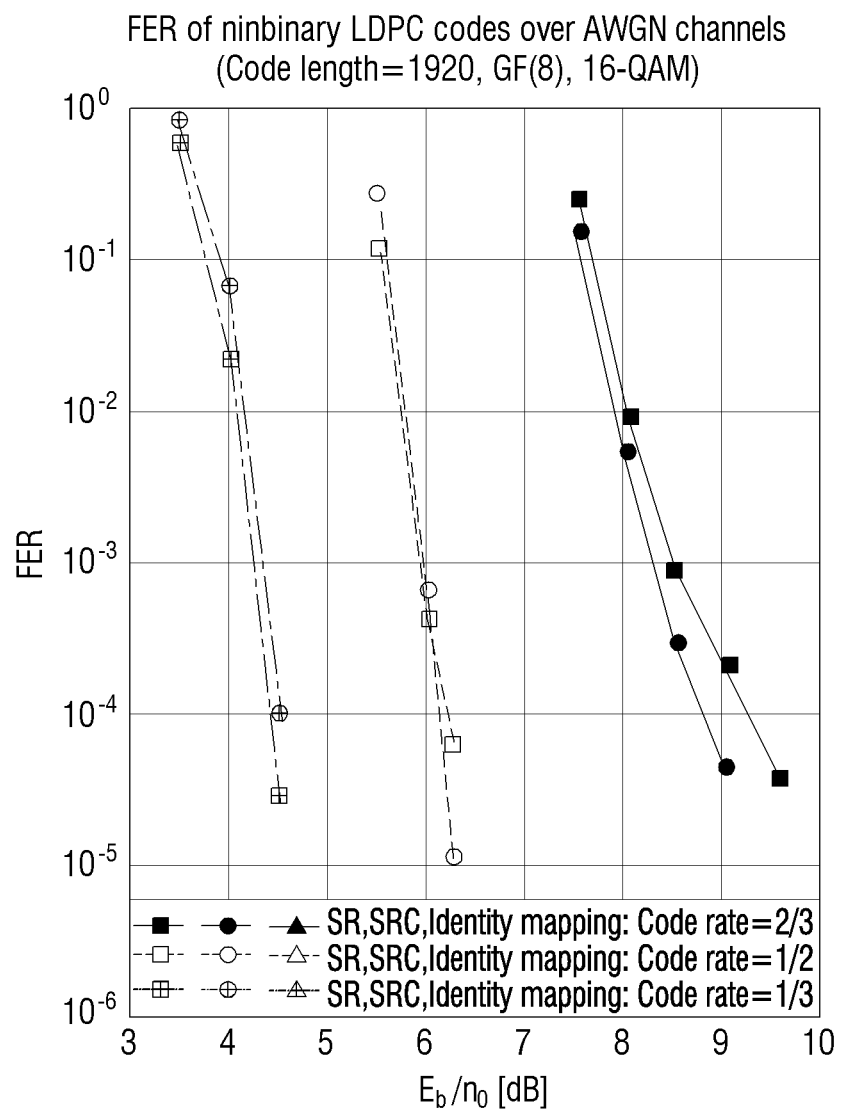
Figure 13:
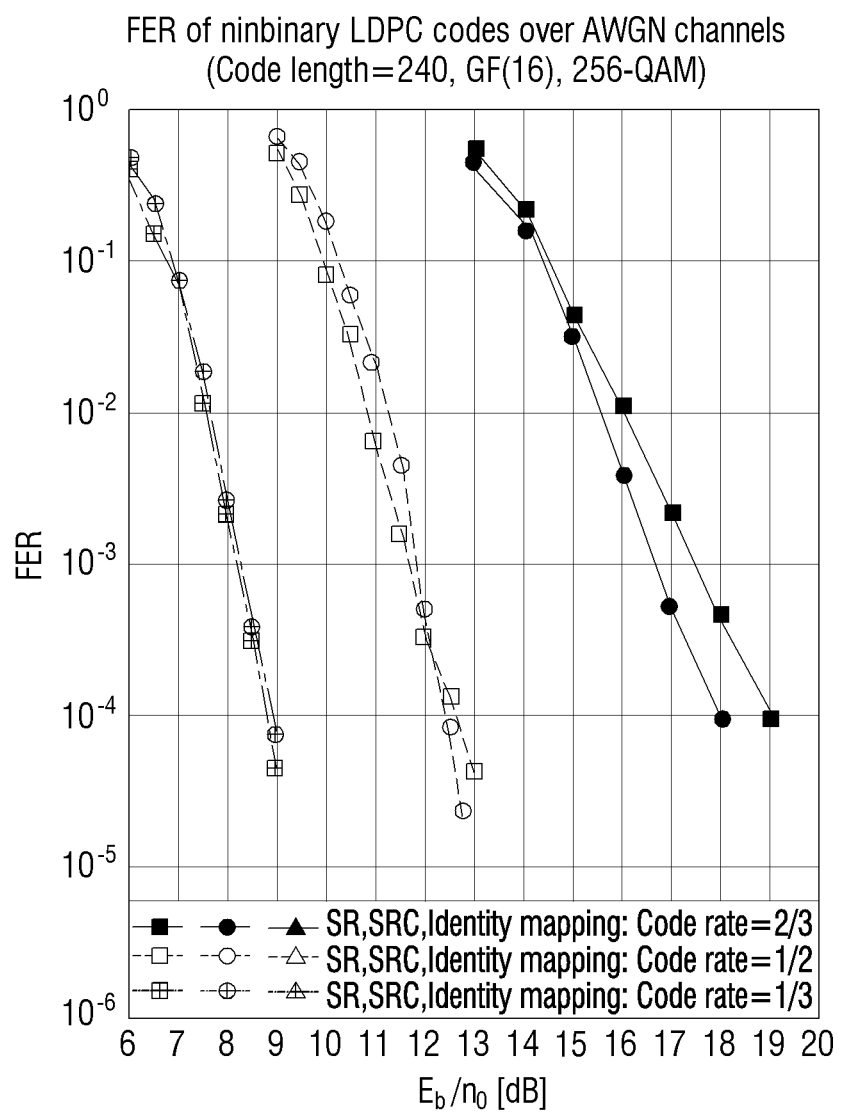
Figure 14:
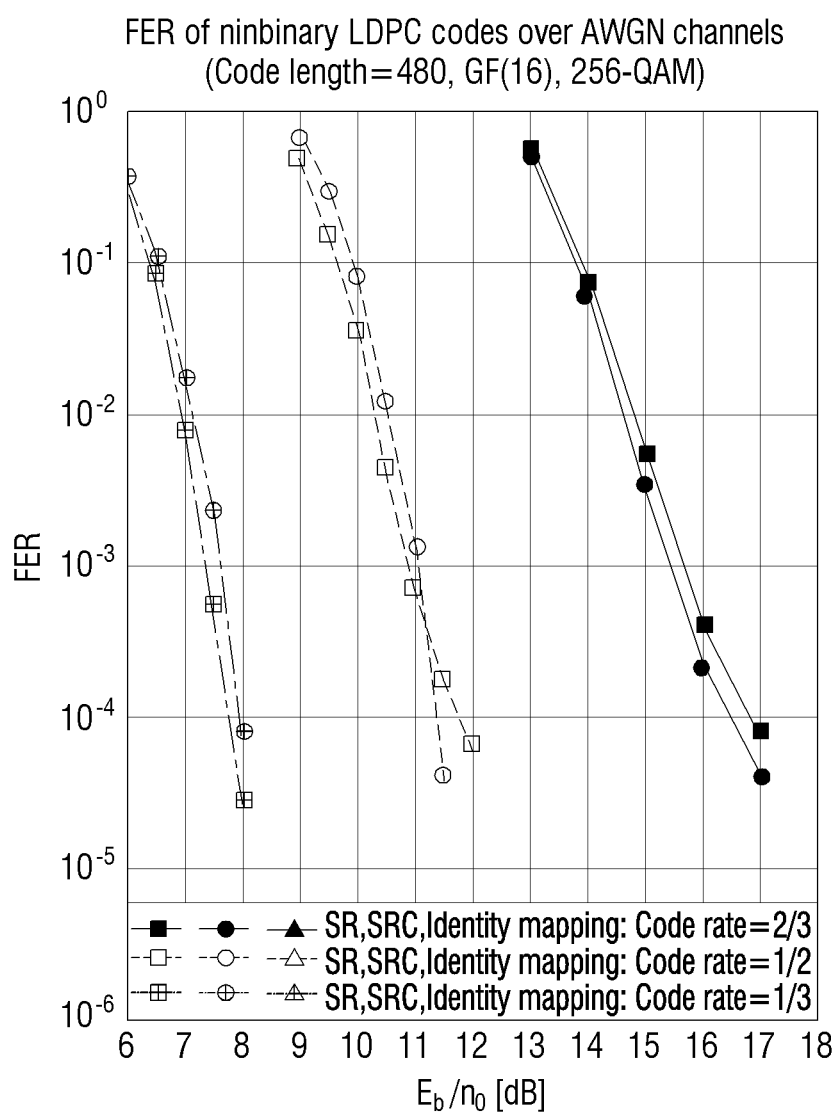
Figure 15:
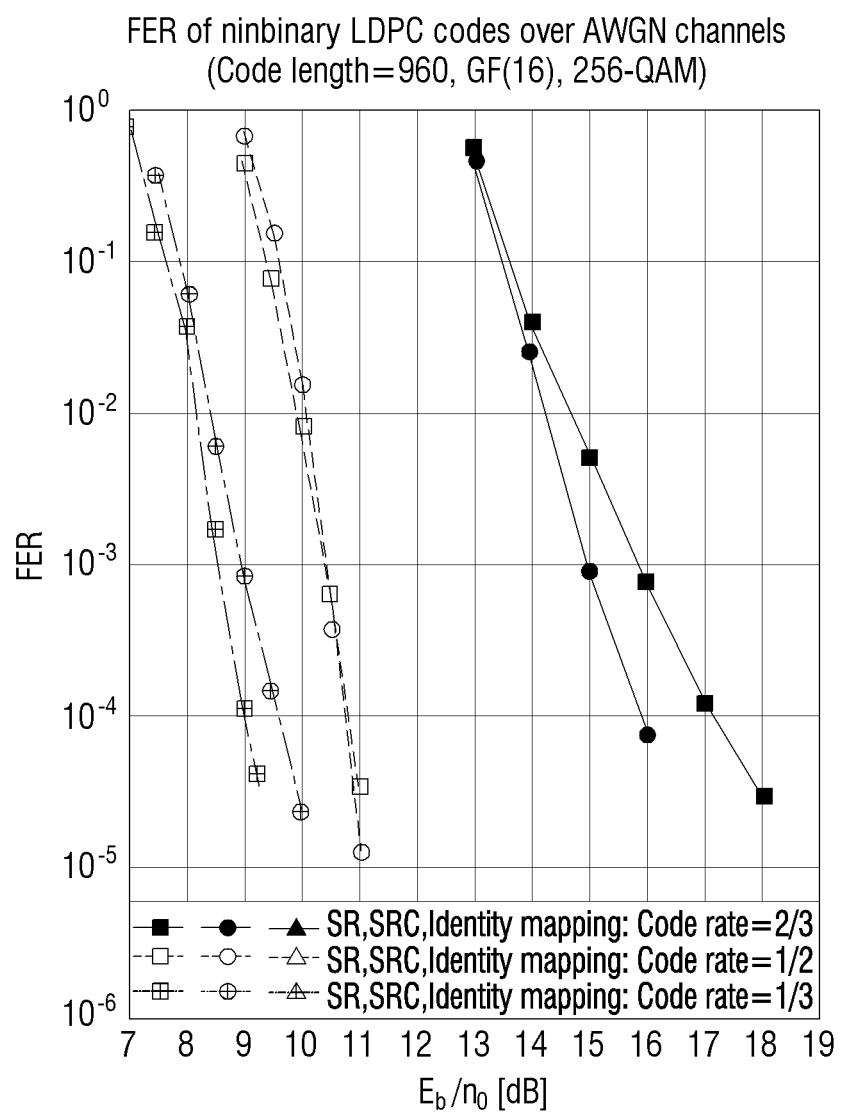
Figure 16:
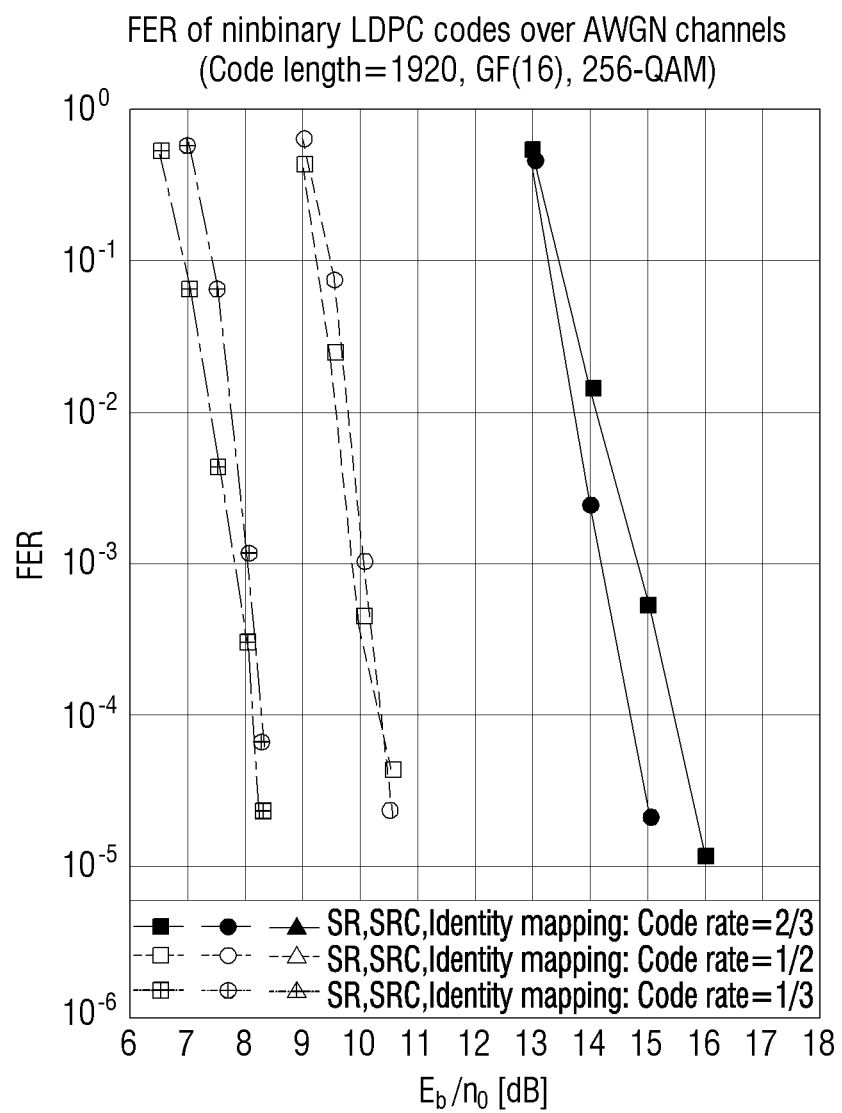

Identity mapping illustrated in FIGS. 5 and 16 refers to a case where codeword symbols are output from the interleaver 120 without the original order of codeword symbols being changed. The identity mapping was added to be compared with SR mapping and SRC mapping.

LDPC codes whose codeword lengths are 240, 480, 960 and 1920 respectively and whose code rates are ⅓, ½, ⅔, respectively, are designed to be used for each of the three mapping. Optimal values are selected for mean column weights (MCW) for each of the designed codes through the Monte Carlo analysis.

Positions of non-binary elements of a parity check matrix are determined by the progressive edge-growth (PEG) algorithm and values of non-binary elements are determined by design methods suggested by Poulliat, et al.

FIGS. 5 to 8 illustrate frame error rates (FER) that can occur in the case where a non-binary LDPC code defined over Galois Field, GF(4), is used together with 16-QAM. It is confirmed that in case where SRC mapping is used for non-binary LDPC codes each having different codeword lengths and different code rates, better frame error rates are achieved than a case where mapping other than SRC mapping is used.

Tables 1 and 2 illustrate coding gains [dB] that can be obtained respectively in a case where SRC mapping is used, compared with a case where SR mapping is used, when frame error rates are $10^{-3}$ and $10^{-4}$, respectively.

TABLE 1

| FER = $10^{-3}$ | | Code length | | | |
|---|---|---|---|---|---|
| | | 240 | 480 | 960 | 1920 |
| Code rate | 1/3 | 0.14 | 0.16 | 0.12 | 0.05 |
| | 1/2 | 0.24 | 0.40 | 0.35 | 0.42 |
| | 2/3 | 0.37 | 0.50 | 0.60 | 0.65 |

TABLE 2

| FER = $10^{-4}$ | | Code length | | | |
|---|---|---|---|---|---|
| | | 240 | 480 | 960 | 1920 |
| Code rate | 1/3 | 0.36 | 0.32 | 0.21 | 0.12 |
| | 1/2 | 0.39 | 0.55 | 0.60 | 0.62 |
| | 2/3 | 0.48 | 0.62 | 0.92 | 0.97 |

Referring to Tables 1 and 2, it can be confirmed that use of SRC mapping achieves better frame error rates, as compared with when SR mapping is used.

FIGS. 9 to 12 illustrate frame error rates when non-binary LDPC code was used together with 64-QAM. It can be confirmed that, in case of non-binary LDPC code having a code rate of 2/3, frame error rates exhibited when using SCR mapping was advantageous as compared with when using other mapping. By comparison, it was confirmed that the lower code rates are reduced, for example, to 1/3, the lower coding gain obtained using SRC mapping was obtained, and thus better frame error rates was achieved when using SR mapping.

In case of non-binary LDPC code having a low code rate, the number of variable nodes corresponding to an information word is relatively lower than that of variable nodes corresponding to a parity. Thus, in the case of using SRC mapping, non-binary LDPC code having a low code rate has a lower possibility that the reliability of LSS is compensated in an iterative decoding process.

Tables 3 and 4 illustrate coding gains that can be achieved respectively in a case where SRC mapping is used, as compared with a case where SR mapping is used, when frame error rates are $10^{-3}$ and $10^{-4}$, respectively.

TABLE 3

| FER = $10^{-3}$ | | Code length | | | |
|---|---|---|---|---|---|
| | | 240 | 480 | 960 | 1920 |
| Code rate | 1/3 | −0.29 | −0.01 | −0.15 | −0.07 |
| | 1/2 | 0.07 | 0.04 | 0.20 | −0.03 |
| | 2/3 | 0.40 | 0.31 | 0.35 | 0.20 |

TABLE 4

| FER = $10^{-4}$ | | Code length | | | |
|---|---|---|---|---|---|
| | | 240 | 480 | 960 | 1920 |
| Code rate | 1/3 | −0.22 | −0.01 | −0.16 | −0.08 |
| | 1/2 | 0.31 | 0.33 | 0.45 | 0.07 |
| | 2/3 | 0.52 | 0.44 | 0.51 | 0.36 |

Referring to Tables 3 and 4, it can be confirmed that when having a low code rate, when a non-binary LDPC code defined over GF(8) uses SR mapping, better performance is achieved, as compared with when it uses SRC mapping.

FIGS. 13 to 16 illustrate frame error rates when a non-binary LDPC code defined over GF(16) is used together with 256-QAM.

Tables 5 and 6 illustrate coding gains that can be obtained respectively in a case where SRC mapping is used, compared with a case where SR mapping is used, when frame error rates were $10^{-3}$ and $10^{-4}$, respectively.

TABLE 5

| FER = $10^{-3}$ | | Code length | | | |
|---|---|---|---|---|---|
| | | 240 | 480 | 960 | 1920 |
| Code rate | 1/3 | −0.05 | −0.24 | −0.41 | −0.2 |
| | 1/2 | −0.24 | −0.13 | 0.00 | −0.08 |
| | 2/3 | 0.84 | 0.23 | 0.89 | 0.61 |

TABLE 6

| FER = $10^{-4}$ | | Code length | | | |
|---|---|---|---|---|---|
| | | 240 | 480 | 960 | 1920 |
| Code rate | 1/3 | −0.08 | −0.20 | −0.55 | −0.11 |
| | 1/2 | 0.23 | 0.45 | 0.12 | 0.00 |
| | 2/3 | 0.93 | 0.48 | 1.22 | 0.84 |

Referring to Tables 5 and 6, it can be confirmed that when having a low code rate, when a non-binary LDPC code defined over GF(16) uses SRC mapping, lower frame error rates are achieved, as compared with when it uses SR mapping.

Figure 17:
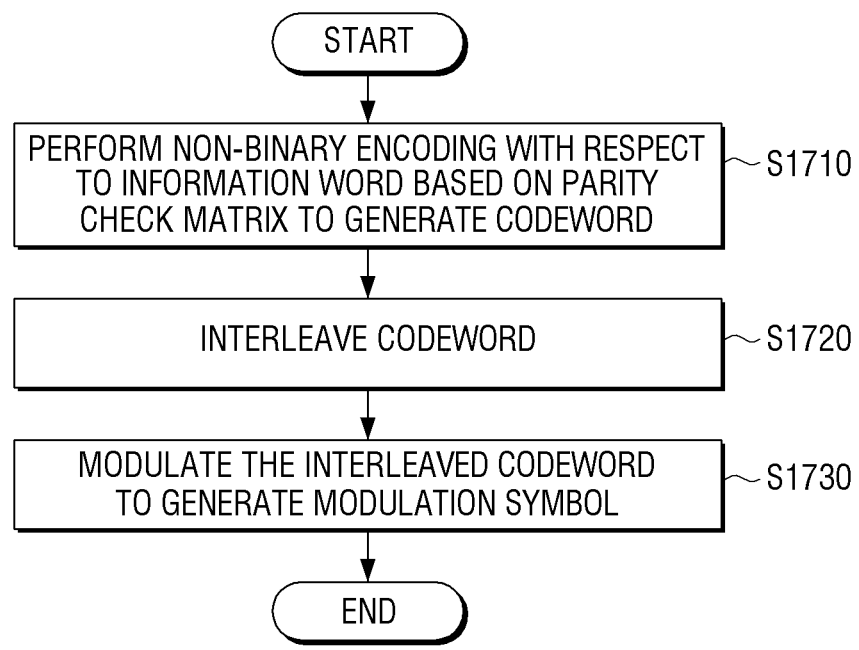
FIG. 17 is a flow chart provided to explain a transmitter and a signal processing method according to an exemplary embodiment.

FIG. 17 is a flow chart provided to explain a signal processing method of a transmitter according to an exemplary embodiment First, non-binary encoding is performed on an information word based on a parity check matrix to generate a codeword (S1710).

Then, the codeword is interleaved (S1720), and the interleaved codeword is modulated to generate a plurality of modulation symbols (S1730).

Then, in step S1710, the codeword is interleaved, such that a predetermined non-binary symbol from among non-binary symbols constituting the codeword is mapped to a predetermined position in a modulation symbol.

Specifically, the codeword may be interleaved, such that a non-binary symbol which corresponds to a column having a relatively higher order in a parity check matrix is mapped to an MSS constituting the modulation symbol and a non-binary symbol which corresponds to a column having a relatively lower order in the parity check matrix is mapped to an LSS constituting the modulation symbol.

On the other hand, the codeword may be interleaved, such that a non-binary symbol which corresponds to a column having a relatively lower order in a parity check matrix is mapped to an MSS constituting the modulation symbol and a non-binary symbol which corresponds to a column having a relatively higher order in the parity check matrix is mapped to an LSS constituting the modulation symbol An interleaving method and Tables 2 and 3 have been described above.

According to an exemplary embodiment, a signal processing method of a receiver may be provided, and this method may be configured of the functions of the receiver 400 of FIG. 4 as described above.

A non-transitory computer readable medium may be provided which stores a program carrying out the signal processing methods described above, according to an exemplary embodiment.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as compact disc (CD), digital versatile disc (DVD), hard disk, Blu-ray disk, universal serial bus (USB), memory card, and read-only memory (ROM) and provided therein.

The components, units or elements (hereafter collectively referred to as "components") represented by a block as illustrated in FIGS. 1 and 4 may be embodied as various numbers of hardware, software and/or firmware structures that execute respective functions described above, according to an exemplary embodiment. For example, these components may use a direct circuit structure, such as a memory, a processor, a look-up table, etc. that may execute the respective functions through controls of one or more microprocessors or other control apparatuses. Also, these components may be specifically embodied by a program or a part of code, which contains one or more executable instructions for performing specified logic functions. Also, at least one of these components may further include a processor such as a central processing unit (CPU) that performs the respective functions, a microprocessor, or the like. Although a bus is not illustrated in the above block diagrams, communication between the respective blocks may be performed via the bus.

The foregoing exemplary embodiments and advantages are merely exemplary and should not be construed as limiting the inventive concept. Also, the description of the exemplary embodiments of the inventive concept is intended to be illustrative, and not to limit the scope of the claims, and many alternatives, modifications, and variations will be apparent to those skilled in the art.

What is claimed is:

1. A transmitter comprising:
an encoder configured to encode an information word based on a parity check matrix to generate a codeword comprising a plurality of non-binary symbols;
an interleaver configured to interleave the codeword; and
a modulator configured to modulate the interleaved codeword to generate a plurality of modulation symbols,
wherein the interleaver is configured to interleave the codeword such that the modulator maps at least one of non-binary symbols, which corresponds to a column having a relatively higher degree in the parity check matrix among the plurality of non-binary symbols, to a most significant symbol (MSS) constituting the modulation symbol, and maps at least one of non-binary symbols, which corresponds to a column having a relatively lower degree in the parity check matrix among the plurality of non-binary symbols, to a least significant symbol (LSS) constituting the modulation symbol.

2. The transmitter of claim 1, wherein the non-binary symbols mapped to the MSS and the LSS are transmitted from the transmitter to a receiver of the codeword through two different channels, respectively.

3. The transmitter of claim 2, wherein the non-binary symbol mapped to the MSS is transmitted from the transmitter to the receiver through a relatively low reliability channel, and the non-binary symbol mapped to the LSS is transmitted from the transmitter to the receiver through a relatively high reliability channel.

4. The transmitter of claim 1, wherein the interleaver is configured to interleave the codeword to generate a plurality of pairs of non-binary symbols, each pair having a non-binary symbol corresponding to a column having a relatively higher order and a non-binary symbol corresponding to a column having a relatively lower order.

5. The transmitter of claim 4, wherein the modulator is configured to map the plurality of pairs of non-binary symbols to the plurality of modulation symbols, respectively.

6. The transmitter of claim 5, wherein the modulator is configured to map one of non-binary symbols of each pair to one of a most significant symbol (MSS) and a least significant symbol (LSS) of each of the modulation symbols, and map the other of the non-binary symbols of each pair to the other of the MSS and the LSS of each of the modulation symbol.

7. The transmitter of claim 1, wherein the encoder is configured to convert bits input to the encoder to the non-binary symbols constituting the information word and perform the encoding on the information word to generate the codeword.

8. A transmitter comprising:
an encoder configured to encode an information word based on a parity check matrix to generate a codeword comprising a plurality of non-binary symbols;
an interleaver configured to interleave the codeword; and
a modulator configured to modulate the interleaved codeword to generate a plurality of modulation symbols,
wherein the interleaver is configured to interleave the codeword such that the modulator maps at least one of non-binary symbols, which corresponds to a column having a relatively lower degree in the parity check matrix among the plurality of non-binary symbols, to a most significant symbol (MSS) constituting the modulation symbol, and maps at least one of non-binary symbols, which corresponds to a column having a relatively higher degree in the parity check matrix among the plurality of non-binary symbols, to a least significant symbol (LSS) constituting the modulation symbol.

9. The transmitter of claim 8, wherein the non-binary symbols mapped to the MSS and the LSS, respectively, are transmitted from the transmitter to a receiver of the codeword through two different channels.

10. A signal processing method of a transmitter, the method comprising:
encoding an information word based on a parity check matrix to generate a codeword comprising a plurality of non-binary symbols;
interleaving the codeword; and
modulating the interleaved codeword to generate a plurality of modulation symbols,
wherein the interleaving comprises interleaving the codeword such that at least one of non-binary symbols, which corresponds to a column having a relatively higher degree in the parity check matrix among the plurality of non-binary symbols, is mapped to a most significant symbol (MSS) constituting the modulation symbol, and at least one of non-binary symbols, which corresponds to a column having a relatively lower degree in the parity check matrix among the plurality of non-binary symbols, is mapped to a least significant symbol (LSS) constituting the modulation symbol.

11. The method of claim 10, further comprising transmitting the non-binary symbols mapped to the MSS and the LSS to a receiver of the codeword through two different channels, respectively.

12. The method of claim 11, wherein the non-binary symbol mapped to the MSS is transmitted to the receiver through a relatively low reliability channel, and the non-binary symbol mapped to the LSS is transmitted to the receiver through a relatively high reliability channel.

13. The method of claim 10, the interleaving comprises interleaving the codeword to generate a plurality of pairs of non-binary symbols, each pair having a non-binary symbol corresponding to a column having a relatively higher order and a non-binary symbol corresponding to a column having a relatively lower order.

14. The method of claim 13, wherein the modulating comprises mapping the plurality of pairs of non-binary symbols to the plurality of modulation symbols, respectively.

15. The method of claim 14, wherein the modulating comprises mapping one of non-binary symbols of each pair to one of a most significant symbol (MSS) and a least significant symbol (LSS) of each of the modulation symbols, and mapping the other of the non-binary symbols of each pair to the other of the MSS and the LSS of each of the modulation symbol.

16. The method of claim 10, further comprising converting binary bits to the non-binary symbols constituting the information word before the performing encoding on the information word.

17. A signal processing method of a transmitter, the method comprising:
  encoding an information word based on a parity check matrix to generate a codeword comprising a plurality of non-binary symbols;
  interleaving the codeword; and
  modulating the interleaved codeword to generate a plurality of modulation symbols,
  wherein the interleaving comprises interleaving the codeword such that at least one of non-binary symbols, which corresponds to a column having a relatively lower degree in the parity check matrix among the plurality of non-binary symbols, is mapped to a most significant symbol (MSS) constituting the modulation symbol, and at least one of non-binary symbols, which corresponds to a column having a relatively higher degree in the parity check matrix among the plurality of non-binary symbols, is mapped to a least significant symbol (LSS) constituting the modulation symbol.

18. The method of claim 17, further comprising transmitting the non-binary symbols mapped to the MSS and the LSS to a receiver of the codeword through two different channels, respectively.

* * * * *